(12) United States Patent
Augeraud et al.

(10) Patent No.: US 6,407,358 B2
(45) Date of Patent: Jun. 18, 2002

(54) PROCESS AND UNIT FOR PLASMA-ARC WORKING WITH A GAS HAVING CONTROLLED $O_2$ AND $N_2$ CONTENTS

(75) Inventors: Regis Augeraud; Serge Suzon, both of Pontoise; Michel Delzenne, Franconville, all of (FR)

(73) Assignee: L'Air Liquide, Societe Anonyme a directoire et Conseil de Surveillance pour l'Etude et l'Exploitation des Procedes Georges Claude, Paris (FR)

(*) Notice: Subject to any disclaimer, the term of this patent is extended or adjusted under 35 U.S.C. 154(b) by 0 days.

(21) Appl. No.: 09/785,313

(22) Filed: Feb. 20, 2001

(30) Foreign Application Priority Data

Feb. 18, 2000 (FR) .............................. 00 02022

(51) Int. Cl.[7] .............................................. B23K 10/00
(52) U.S. Cl. ............................ 219/121.39; 219/121.55; 219/121.44
(58) Field of Search ........................ 219/121.55, 121.54, 219/121.39, 121.44, 121.45, 121.46, 121.59

(56) References Cited

U.S. PATENT DOCUMENTS

| 3,758,746 A | | 9/1973 | Bykhovsky et al. | |
|---|---|---|---|---|
| 4,611,109 A | * | 9/1986 | Larue et al. | 219/121.59 |
| 5,695,662 A | | 12/1997 | Couch, Jr. et al. | |
| 5,773,785 A | * | 6/1998 | Takeuchi et al. | 219/121.44 |
| 5,801,355 A | * | 9/1998 | Saio | 219/121.44 |
| 6,232,575 B1 | * | 5/2001 | Oakley et al. | 219/121.55 |

FOREIGN PATENT DOCUMENTS

EP     0 768 139     4/1997

* cited by examiner

*Primary Examiner*—Mark Paschall
(74) *Attorney, Agent, or Firm*—Young & Thompson

(57) ABSTRACT

Process and unit for the arc working, particularly plasma cutting, of a workpiece, in which a plasma torch is supplied with an electric current and with a gas mixture containing oxygen and nitrogen, and a plasma jet obtained by the ionization of the gas mixture by the electric current is delivered by means of the plasma torch. The concentration of nitrogen and oxygen in the gas mixture is less than 50%. The gas mixture is obtained by adding a defined amount of nitrogen or, depending on the case, oxygen immediately before the gas mixture is introduced into the torch. The amount of nitrogen or oxygen is defined according to the thickness of the workpiece, to the grade of the constituent material of the workpiece, to the desired work rate and/or to the intensity of the electric current.

8 Claims, 3 Drawing Sheets

Figure 1:
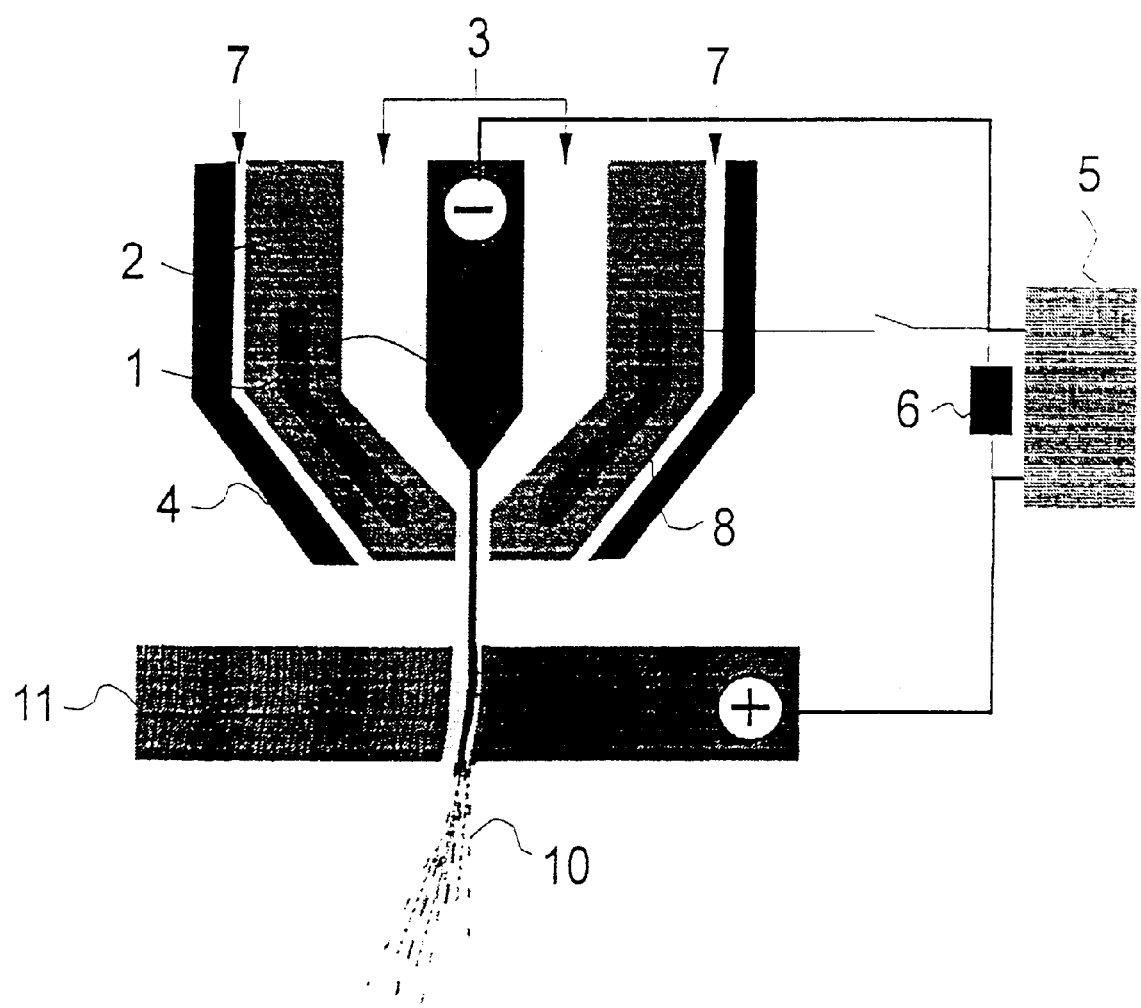

PROCESS AND UNIT FOR PLASMA-ARC WORKING WITH A GAS HAVING CONTROLLED $O_2$ AND $N_2$ CONTENTS

BACKGROUND OF THE INVENTION

The present invention relates to a plasma-arc work process using a plasma torch supplied with a gas mixture of an oxidizing gas and nitrogen, the amount of one gas in the mixture with respect to the other being defined according to one or more parameters chosen from the thickness and/or the grade of the constituent material of the workpiece, the desired work rate and the intensity of the electric current.

A plasma-arc torch that can be used in a cutting, welding, marking or spraying operation, or in any other heat-treatment operation, on a metallic or nonmetallic material usually comprises an electrode made of copper or of a copper alloy carrying a cylindrical insert generally made of hafnium, tungsten or zirconium, on which the electric arc serving to ionize the gas feeding the torch takes root, that is to say the defined flow rate of pressurized gas, called plasma gas, which is delivered between the electrode and the nozzle and which flows out via an orifice of said nozzle toward the workpiece.

The electrode is generally centered above this orifice for ejecting the plasma jet, which is placed axially in the nozzle and which forms a constriction diaphragm.

In the particular case of a plasma cutting operation, the plasma cutting device or system usually comprises a plasma torch, a source of electric current, an electric-arc ignition system and one or more sources of fluids, particularly of plasma gas, possibly of shielding gas or of post-injected fluid, and of fluid for cooling the torch, generally distilled water.

Such torches or units are well known to those skilled in the art, since they have already been described in many documents to which reference may be made for further details, especially EP-A-599709, EP-A-872300, EP-A-801882, EP-A-941018, EP-A-144267, EP-A-410875, EP-A-772957, EP-A-902606, EP-A-810052, EP-A-845929, EP-A-790756, EP-A-196612, WO-A-89/11941, U.S. Pat. No. 4,521,666, U.S. Pat. No. 4,059,743, U.S. Pat. No. 4,163,891 and U.S. Pat. No. 5,591,357.

In a known manner, plasma-arc cutting uses the thermal and kinetic effects of a plasma jet to melt the material to be cut and to expel the molten material from the kerf formed after the torch has moved relative to the workpiece.

Moreover, it is also known that, in plasma cutting, the plasma gas or gas mixture used is not the same depending on the nature of the material to be cut.

Thus, a nonoxidizing gas, for example nitrogen, is generally used for stainless steels or for light alloys, whereas it is preferred to use an oxidizing gas, such as oxygen or air, for cutting structural steels. However, in the case of structural steels, even though compressed air has the advantage of being simpler to use than oxygen, since a simple air compressor is sufficient to supply the torch and there is therefore no need to supply gas bottles, it is found that the air used as cutting gas results in cut faces which are of inferior quality to those obtained using oxygen, that is to say it results in the presence of flash and of striations. Oxygen is therefore usually preferred for this reason.

Moreover, the use of mixtures of nitrogen and oxygen in proportions of about 30% nitrogen, as plasma gas, make it possible to increase the cutting speed by about 20% with respect to pure oxygen.

In addition, this same type of nitrogen/oxygen mixture used as a dual flow enables, in some cases, the roughness of the cut faces to be reduced.

However, this nitrogen/oxygen mixture is usually premixed, that is to say manufactured according to the chosen contents, before being used to fill suitable containers, such as gas bottles, which are then taken to the operating site, that is to say the point where the cutting has to be carried out.

SUMMARY OF THE INVENTION

Now, the fact that this type of nitrogen/oxygen mixture must be premixed and contained in gas bottles poses a problem.

Thus, it will be understood that, when a nitrogen/oxygen mixture has to be used with different nitrogen contents in the oxygen in order to comply with several different cutting applications or situations, it is necessary to store as many gas bottles as desired contents, that is to say nitrogen/oxygen mixtures having different nitrogen contents.

This therefore requires the use of a large stock of gas bottles of different compositions suitable for the various situations that might arise and also requires many bottle movements and handling operations.

Under these conditions, it is essential to put into place strict procedures for storing and handling each bottle, as well as precise monitoring of the stocks in order to prevent any shortage in terms of a particular gas mixture, something which is difficult to manage and involves relatively large financial investment and operating costs.

The object of the present invention is therefore to solve these problems of bottle storage and movement while making it easier to use mixtures of nitrogen and oxygen of different contents.

In other words, the aim of the present invention is to provide a plasma-arc work process using nitrogen/oxygen mixtures of variable contents compatible with various arc-work situations, particularly various material-cutting situations, while at the same time maintaining or improving the cutting performance in terms of rate, flash and/or roughness of the cut faces, and, more generally, a plasma-arc work process using nitrogen/oxygen-containing gas mixtures.

The present invention therefore relates to a process for the plasma-arc working of at least one workpiece made of structural steel, in which:

(a) a plasma torch is supplied with an electric current and with a gas mixture containing oxygen and nitrogen, (b) a plasma jet obtained by the ionization of at least part of said gas mixture containing oxygen and nitrogen by said electric current is delivered by means of said plasma torch, wherein:

the concentration of nitrogen in the gas mixture containing oxygen and nitrogen is greater than 0% by volume and less than 50% by volume, said gas mixture is obtained by the addition of a defined amount of nitrogen to an oxidizing gas containing oxygen, said addition of nitrogen being carried out immediately before the gas mixture containing oxygen and nitrogen is introduced into said torch, and the defined amount of nitrogen is defined according to at least one parameter chosen from the thickness of the workpiece, the grade of the constituent structural steel of the workpiece, the desired work rate and the intensity of the electric current.

So-called "structural" steels are defined by the Comité Européen de Normalisation [*European Standardization*

Committee] as belonging to the families of nonalloy steels, low-alloy steels or high-alloy steels satisfying the EN 10025, EN 10113-2, EN 10113-3, EN 10137-3 et seq. standards.

According to another aspect, the invention also relates to a process for the plasma-arc working of at least one workpiece made of stainless steel, in which:

(a) a plasma torch is supplied with an electric current and with a gas mixture containing oxygen and nitrogen, (b) a plasma jet obtained by the ionization of at least part of said gas mixture containing oxygen and nitrogen by said electric current is delivered by means of said plasma torch, wherein:

the concentration of oxygen in the gas mixture containing oxygen and nitrogen is greater than 0% by volume and less than 25% by volume, said gas mixture is obtained by the addition of a defined amount of oxygen or of a gas containing oxygen in nitrogen, said addition of oxygen being carried out immediately before the gas mixture containing oxygen and nitrogen is introduced into said torch, and the amount of oxygen or of oxidizing gas containing oxygen is defined according to at least one parameter chosen from the thickness of the workpiece, the grade of the constituent stainless steel of the workpiece, the desired work rate and the intensity of the electric current.

Steels-called "stainless" steels belong, according to the Comité Européen de Normalisation [*European Standardization Committee*] to the family of alloy steels containing at least 11% chromium.

Depending on the case, the process of the invention may include one or more of the following characteristics:

the plasma-arc work process is a plasma cutting or plasma marking, preferably plasma cutting, process;

the grade of the constituent material of the workpiece is chosen from structural steels and stainless steels;

the material making up the workpiece may or may not include a surface coating such as of paint, zinc, aluminum or another protective coating;

the process uses a plasma gas mixture adapted or adaptable to the work to be carried out;

the concentration of nitrogen in the gas mixture containing oxygen and nitrogen is between 10% by volume and 40% by volume, preferably between 20% by volume and 40% by volume, for work on structural steel;

the concentration of oxygen in the gas mixture containing oxygen and nitrogen is between 1% by volume and 22% by volume, preferably between 5% by volume and 20% by volume, for working on stainless steels;

the oxidizing gas is oxygen or compressed air, which is possibly dried and stripped of dust and of oil droplets liable to be generated by compression, and preferably oxygen;

the addition of gas is carried out in at least one gas mixer, preferably said gas mixer includes means for controlling or adjusting the content of the gas to be added;

the amount of gas to be added is defined according to the thickness of the workpiece and to at least one parameter chosen from the grade of the material, the desired work rate and the intensity of the electric current;

the thickness of the workpiece is between 0.4 mm and 20 mm, preferably between 0.5 mm and 12 mm;

the desired work rate is between 0.5 and 10 m/min, preferably between 1 and 5 m/min;

the intensity of the current is between 10 A and 150 A, preferably between 15 and 120 A;

The invention also relates to a unit for the plasma-arc working of at least one workpiece, particularly one capable of implementing a process as mentioned above, which comprises:

at least one plasma torch fastened to a support frame and able to move along at least one axis of movement, at least one current generator connected to said torch, at least one source of an oxidizing gas containing oxygen, at least one nitrogen source, at least one gas mixer supplied with the oxidizing gas containing oxygen by said at least one source of oxidizing gas and with nitrogen by said at least one nitrogen source, said gas mixer including means for controlling or adjusting the concentration of nitrogen and/or of oxidizing gas containing oxygen, so as to obtain a gas mixture containing oxygen and nitrogen with a nitrogen concentration in said gas mixture greater than 0% by volume and less than 50% by volume, or an oxygen concentration in said gas mixture greater than 0% by volume and less than 25% by volume, the amount of nitrogen or oxygen being defined according to at least one parameter chosen from the thickness of the workpiece, the grade of the constituent material of the workpiece, the desired work rate and the intensity of the electric current, the gas mixer is placed between said source of oxidizing gas containing oxygen, said nitrogen source, and said torch, means for controlling the flow rate and/or the pressure of the gas mixture are placed between the outlet of the mixer and the inlet of the torch.

By virtue of the present invention, it is possible, from pure or substantially pure gases and because of the use of a means of adding and controlling either the amount of nitrogen mixed into the oxidizing gas, such as oxygen or compressed air, or the amount of oxidizing gas, such as oxygen or compressed air, mixed into the nitrogen to guarantee, in a plasma cutting machine, a controlled content of each constituent of the nitrogen/oxygen mixture which is adapted to each particular use or operation that has to be carried out.

Precise control of the content of each constituent depending on the type of application makes it possible to increase the plasma cutting performance according to productivity and/or quality criteria.

The nitrogen content in the oxygen or the oxygen content in the nitrogen is controlled automatically by an external control depending on several parameters, such as the thickness of the sheet, the intensity of the current, the grade of material to be cut, the cutting rate, etc.

FIG. 1 appended hereto shows schematically the operation of the active part of a plasma torch of the dual-flow type, shown during an operation of cutting a sheet 11.

The plasma torch includes an electrode 1 where the electric arc serving to ionize the gas feeding the torch, that is to say the defined flow of pressurized plasma gas, which is delivered and flows into the plasma chamber 3 located between the electrode 1 and the nozzle 2, takes root. The plasma jet 10 is expelled from the plasma chamber 3 via an orifice made in the nozzle 2 toward the sheet 11 to be cut. The electrode 1 is centered above the plasma-jet ejection orifice made axially in the nozzle 2 and forming a constriction orifice.

The plasma torch is supplied with electric current by an electric current source 5 connected to an electric arc ignition system 6 allowing a leading arc to be struck between the nozzle 2 and the electrode 1.

FIG. 1 also shows that the torch is of the dual-flow type, that is to say it has a peripheral second nozzle 4 forming a sleeve around the nozzle 2 and that a shielding gas flows through the inter-nozzle space 7 until it reaches the region of space lying between the end of the nozzle 2 and the upper surface of the sheet 11. The nozzle 2 is cooled by a coolant, such as distilled water, circulating in a cooling chamber 8.

Figure 2:
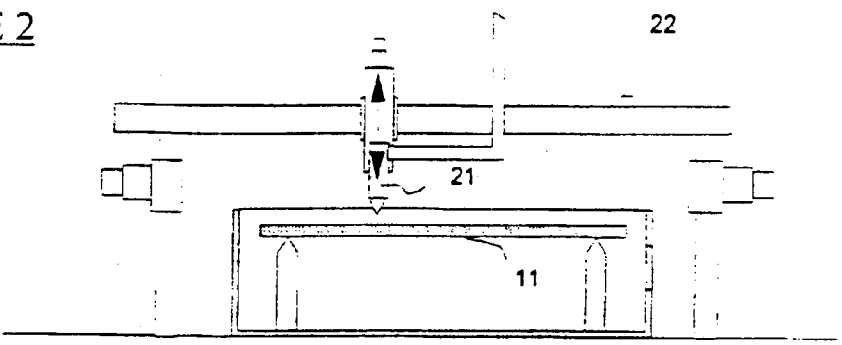

As regards FIG. 2, this shows schematically a plasma cutting unit, seen from the front, comprising schematically at least one plasma cutting torch 21, operating as explained above and illustrated in FIG. 1, fixed to at least one motorized shaft 22 for relative movement of said torch 21 with respect to the workpiece 11, that is to say the sheet to be cut.

Figure 3:
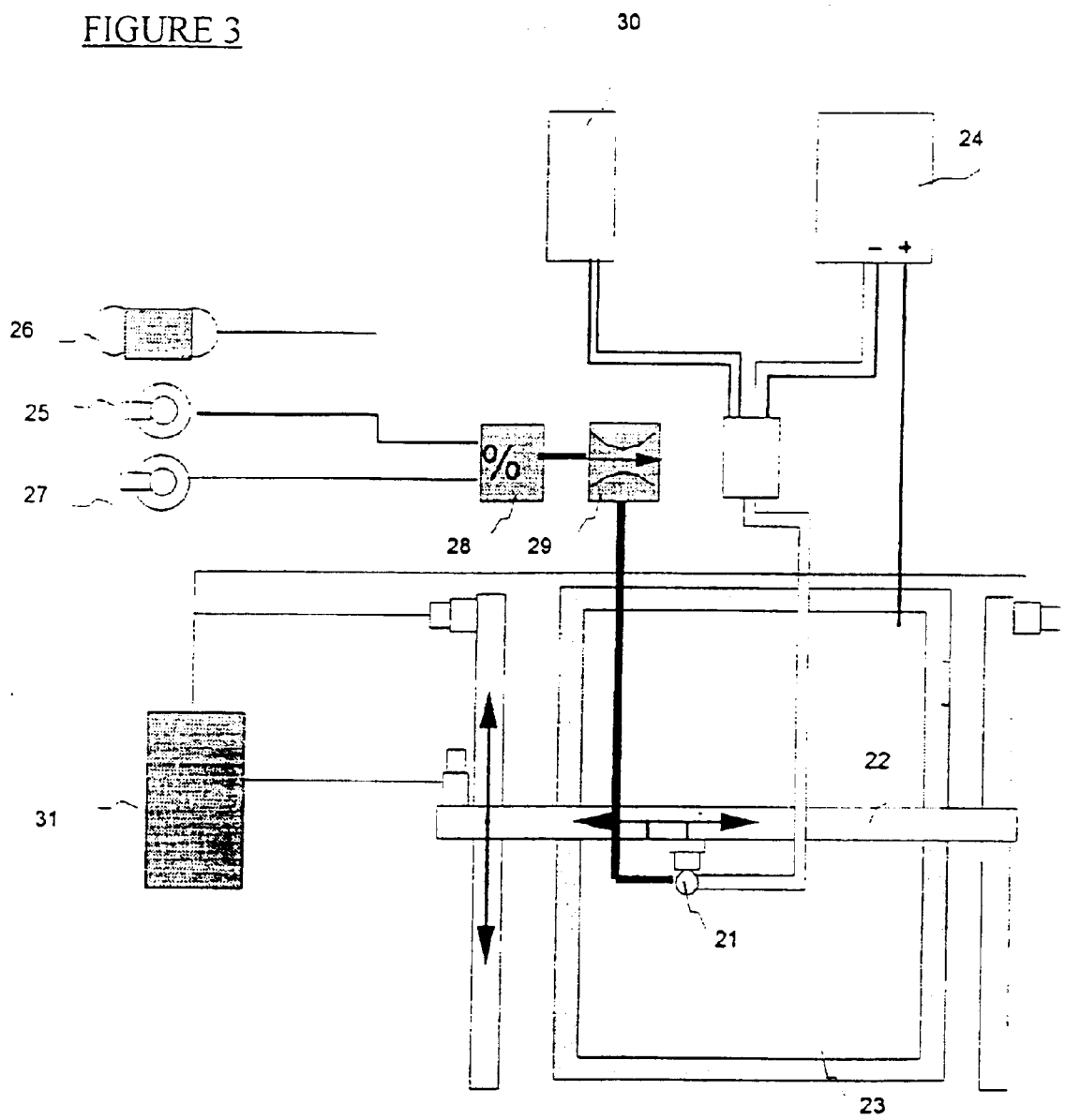

As may be seen in FIG. 3, which is a top view of the unit in FIG. 2, the plasma cutting torch 21 is connected to a current generator 24.

The unit also includes means of connection, of distribution and of information exchange between said current generator 24, the torch 21 and said movement shaft.

A supply source 25 of oxidizing gas, such as oxygen, or a compressed-air compressor 26 and a nitrogen supply source 27 allow the torch 21 to be supplied with the cutting gas.

Between said gas sources 25, 26, 27 and the plasma cutting torch, there is a gas mixer 28 which receives, on the one hand, the oxidizing gas and the nitrogen and delivers, on the other hand, the plasma gas mixture to said torch 21 in the required mixture proportions, that is to say having a nitrogen and oxygen content controlled according to the present invention.

The mixer 28 is provided with means for controlling the content of one gas in the other, for example by controlling or adjusting the nitrogen content.

Additional means 29 for controlling the flow rate and/or pressure, for example an expansion valve or a mass flow rate regulator, are preferably inserted between the outlet of the mixer 28 and the torch 21.

Such a unit may furthermore include means 30 for cooling the torch 21, means for managing the work cycles and means 31 for programming and managing the movements of said at least one movement shaft.

By using such a unit, the content of one gas in the other, for example nitrogen in oxygen, is controlled so as to optimize the cutting performance in terms of productivity (increase in cutting speed) and/or in terms of quality (decrease in flash, roughness or taper) of the cut faces.

Thus, depending on the grade of steel or of the material that has to be cut, and/or on its thickness, oxygen having a controlled nitrogen content of strictly between 0 and 50% or, depending on the use, nitrogen having a nonzero and controlled oxygen content of between 0 and 20%, will be used.

Figure 4:
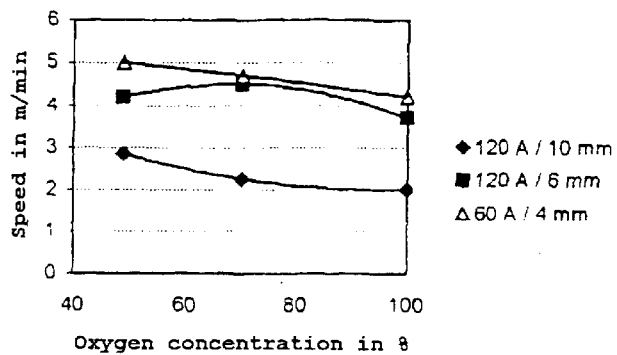
Figure 4:
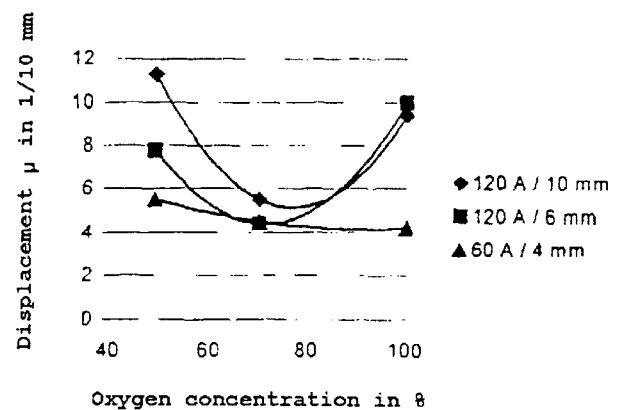
Figure 4:
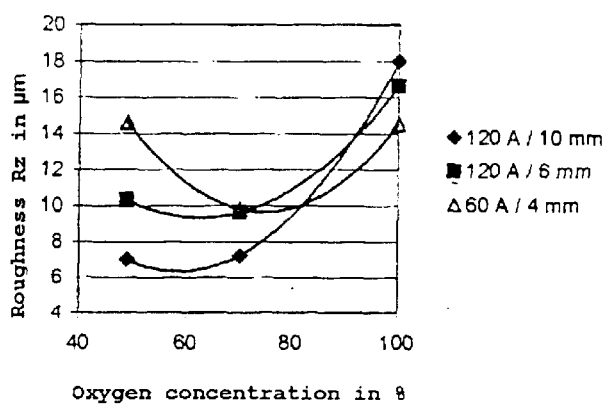

In order to verify the effectiveness of the process of the invention, measurements were made according to the DIN 2310 standard and the results are given in FIG. 4.

A comparison was made regarding the cutting speed, the roughness and the maximum deviation of the cut face from the vertical, according to various nitrogen/oxygen mixture concentrations.

By way of example, according to the present invention, a mixture containing 30% nitrogen in oxygen makes it possible either to increase the cutting speed without increasing the taper or to decrease the taper for a constant speed.

Likewise, depending on the thickness of the sheet, the presence of the nitrogen in the oxygen makes it possible to reduce the flash or the roughness of the cut faces

TABLE

| Sheet made of | Nitrogen (%) | Oxygen (%) | Current (A) | Thickness (mm) | Grade | Speed (m/min) |
|---|---|---|---|---|---|---|
| Stainless steel | 100 to 80 | 0 to 20 | 15 to 120 | 0 to 20 | 304 L 316 L | 1 to 5 |
| Carbon steel | 0 to 50 | 100 to 50 | 15 to 120 | 0 to 15 | E24 | 1 to 5 |

The plasma cutting process according to the invention, in which a mixer allows various types of gas mixtures with controlled contents to be produced from pure gases or from compressed air, can be used by any type of plasma cutting unit, whether manual or automatic, so as to optimize the cutting performance in terms of productivity and/or quality according to the grade of the material.

The invention has been described above in relation to a plasma cutting torch, but, of course, the application of this invention is not limited to only cutting torches and relates, entirely or partly, to marking, welding and spraying torches and, in general, to any torch for the heat treatment of metallic or non-metallic materials.

Furthermore, the invention has the advantages of resulting in a higher speed and a higher productivity when cutting structural steels and in a higher quality of the cut for stainless steels, that is to say of obtaining cut edges with substantially no flash or taper.

What is claimed is:

1. A process for the plasma-arc working of at least one workpiece made of structural steel, in which:
   (a) a plasma torch is supplied with an electric current and with a gas mixture containing oxygen and nitrogen,
   (b) a plasma jet obtained by the ionization of at least part of said gas mixture containing oxygen and nitrogen by said electric current is delivered by means of said plasma torch, wherein:
   the concentration of nitrogen in the gas mixture containing oxygen and nitrogen is greater than 0% by volume and less than 50% by volume,
   said gas mixture is obtained by the addition of a defined amount of nitrogen to an oxidizing gas containing oxygen, said addition of nitrogen being carried out immediately before the gas mixture containing oxygen and nitrogen is introduced into said torch, and
   the defined amount of nitrogen is defined according to at least one parameter chosen from the thickness of the workpiece, the grade of the constituent structural steel of the workpiece, the desired work rate and the intensity of the electric current.

2. The process as claimed in either of claim 1, wherein the plasma-arc work process is a plasma cutting or plasma marking, preferably plasma cutting, process.

3. The process as claimed in one of claim 1, wherein the concentration of nitrogen in the gas mixture containing oxygen and nitrogen is between 10% by volume and 40% by volume, preferably between 20% by volume and 40% by volume.

4. The process as claimed in one of claim 1, wherein the oxidizing gas is oxygen or compressed air, possibly dried and stripped of oil droplets likely to be generated by compression, preferably oxygen.

5. The process as claimed in one of claim 1, wherein the addition of gas is carried out in at least one gas mixer, preferably said gas mixer including means for controlling or adjusting the content of the gas to be added.

6. The process as claimed in one of claims 1, wherein the defined amount of gas to be added is defined according to the thickness of the workpiece and to at least one parameter chosen from the grade of the material, the desired work rate and the intensity of the electric current.

7. The process as claimed in one of claim 1, wherein the thickness of the workpiece is between 0.4 mm and 20 mm, the desired work rate is between 0.5 m/min and 10 m/min, the intensity of the current is between 10 A and 150 A and/or the grade of the constituent material of the workpiece is chosen from 304 L or 316 L stainless steels.

8. A unit for the plasma-arc working of at least one workpiece, particularly one capable of implementing a process as claimed in one of claim 1, which comprises:

at least one plasma torch (21) fastened to a support frame and able to move along at least one axis of movement, at least one current generator (24) connected to said torch (21), at least one source (25, 26) of oxidizing gas containing oxygen, at least one nitrogen source (27), and at least one gas mixer (28) supplied with oxidizing gas containing oxygen by said at least one source (25, 26) of oxidizing gas and with nitrogen by said at least one nitrogen source (27), said gas mixer (28) including means for controlling or adjusting the concentration of nitrogen and/or of oxidizing gas containing oxygen, so as to obtain a gas mixture containing oxygen and nitrogen with a nitrogen concentration in said gas mixture of greater than 0% by volume and less than 50% by volume, or an oxygen concentration in said gas mixture greater than 0% by volume and less than 25% by volume, the amount of nitrogen or oxygen being defined according to at least one parameter chosen from the thickness of the workpiece, the grade of the constituent material of the workpiece, the desired work rate and the intensity of the electric current.

* * * * *